United States Patent
Takahashi et al.

(10) Patent No.: US 10,529,984 B2
(45) Date of Patent: Jan. 7, 2020

(54) NEGATIVE ELECTRODE MATERIAL FOR NON-AQUEOUS ELECTROLYTE SECONDARY BATTERY AND METHOD OF PRODUCING NEGATIVE ELECTRODE ACTIVE MATERIAL PARTICLES

(71) Applicant: SHIN-ETSU CHEMICAL CO., LTD., Tokyo (JP)

(72) Inventors: Kohta Takahashi, Takasaki (JP); Takakazu Hirose, Annaka (JP); Masahiro Furuya, Takasaki (JP); Hiromichi Kamo, Takasaki (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 270 days.

(21) Appl. No.: 15/324,512

(22) PCT Filed: Jun. 19, 2015

(86) PCT No.: PCT/JP2015/003074
§ 371 (c)(1),
(2) Date: Jan. 6, 2017

(87) PCT Pub. No.: WO2016/009590
PCT Pub. Date: Jan. 21, 2016

(65) Prior Publication Data
US 2017/0207450 A1    Jul. 20, 2017

(30) Foreign Application Priority Data
Jul. 15, 2014   (JP) ................................ 2014-145216

(51) Int. Cl.
*H01M 4/36*        (2006.01)
*H01M 4/133*       (2010.01)
(Continued)

(52) U.S. Cl.
CPC .......... *H01M 4/366* (2013.01); *H01M 4/133* (2013.01); *H01M 4/134* (2013.01); *H01M 4/483* (2013.01);
(Continued)

(58) Field of Classification Search
None
See application file for complete search history.

(56) References Cited

U.S. PATENT DOCUMENTS 5,395,711 A    3/1995  Tahara et al.
7,459,236 B2  12/2008  Konishiike et al.
(Continued)

FOREIGN PATENT DOCUMENTS

CN   1794494 A  *  6/2006  ............ H01M 4/134
CN   1794494 A     6/2006
(Continued)

OTHER PUBLICATIONS

English translation for CN1794494A (Year: 2006).*
(Continued)

*Primary Examiner* — Sin J Lee
(74) *Attorney, Agent, or Firm* — Oliff PLC

(57) ABSTRACT

The present invention is a negative electrode material for a non-aqueous electrolyte secondary battery, including negative electrode active material particles containing a silicon compound expressed by $SiO_x$ where $0.5 \leq x \leq 1.6$, the silicon compound being coated with a carbon coating layer composed of a carbon component, wherein the negative electrode active material particles contain a $SiO_2$ component having a tridymite structure and exhibit a diffraction peak around 21.825° with a half width (2θ) of 0.15° or less in X-ray diffraction. This negative electrode material for a non-aqueous electrolyte secondary battery can increase the
(Continued)

battery capacity and improve the cycle performance and the initial charge and discharge performance.

15 Claims, 2 Drawing Sheets

(51) Int. Cl.
| | |
|---|---|
| H01M 4/134 | (2010.01) |
| H01M 4/131 | (2010.01) |
| H01M 4/48 | (2010.01) |
| H01M 4/587 | (2010.01) |
| H01M 4/62 | (2006.01) |
| H01M 4/1391 | (2010.01) |
| H01M 4/485 | (2010.01) |
| H01M 10/0525 | (2010.01) |

(52) U.S. Cl.
CPC ....... *H01M 4/587* (2013.01); *H01M 10/0525* (2013.01)

(56) References Cited

U.S. PATENT DOCUMENTS

| | | | |
|---|---|---|---|
| 8,377,592 B2 | 2/2013 | Jeong et al. | |
| 2006/0068287 A1* | 3/2006 | Morita ................ | H01M 4/134 429/223 |
| 2006/0099507 A1 | 5/2006 | Kogetsu et al. | |
| 2007/0190416 A1 | 8/2007 | Yamada et al. | |
| 2008/0176137 A1 | 7/2008 | Endo et al. | |
| 2009/0202911 A1 | 8/2009 | Fukuoka et al. | |
| 2011/0287313 A1 | 11/2011 | Fukuoka et al. | |
| 2013/0078490 A1 | 3/2013 | Morita et al. | |
| 2013/0266500 A1 | 10/2013 | Fukuoka et al. | |
| 2014/0030597 A1* | 1/2014 | Jung ...................... | C23C 18/54 429/231.1 |
| 2015/0221950 A1 | 8/2015 | Minami et al. | |
| 2015/0303468 A1 | 10/2015 | Kamo et al. | |
| 2016/0028085 A1 | 1/2016 | Kim et al. | |
| 2016/0254537 A1* | 9/2016 | Kamo .................... | H01M 4/48 429/231.8 |
| 2016/0315310 A1* | 10/2016 | Kamo .................... | H01M 4/131 |
| 2016/0344019 A1 | 11/2016 | Hirose et al. | |
| 2018/0151873 A1* | 5/2018 | Matsuno ............. | H01M 4/0459 |

FOREIGN PATENT DOCUMENTS

| | | |
|---|---|---|
| CN | 104813522 A | 7/2015 |
| CN | 105981204 A | 9/2016 |
| JP | 2997741 B2 | 1/2000 |
| JP | 2001-185127 A | 7/2001 |
| JP | 2002-042806 A | 2/2002 |
| JP | 2004-335195 A | 11/2004 |
| JP | 2006-114454 A | 4/2006 |
| JP | 2006-164954 A | 6/2006 |
| JP | 2007-059213 A | 3/2007 |
| JP | 2007-234255 A | 9/2007 |
| JP | 2007-242590 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2011-243535 A | 12/2011 |
| JP | 2013-073764 A | 4/2013 |
| JP | 2013-513206 A | 4/2013 |
| JP | 2013-098070 A | 5/2013 |
| JP | 2013-251097 A | 12/2013 |
| JP | 2014-175071 A | 9/2014 |
| JP | 2015-149221 A | 8/2015 |
| JP | 6196183 B2 | 9/2017 |
| WO | 2011/068767 A1 | 6/2011 |
| WO | 2013/054481 A1 | 4/2013 |
| WO | 2014/049992 A1 | 4/2014 |
| WO | 2014/069117 A1 | 5/2014 |

OTHER PUBLICATIONS

Sep. 29, 2015 International Search Report issued in International Patent Application No. PCT/JP2015/003074.
Jul. 24, 2018 Office Action issued in European Patent Application No. 15822789.2.
Sep. 30, 2018 Office Action issued in Chinese Patent Application No. 201580038214.0.
Nov. 27, 2017 Extended Search Report issued in europran Patent Application No. 15822789.2.
Szczech et al. "Nanostructured silicon for high capacity lithium battery anodes." Energy and Enviormental Science, vol. 4, pp. 56-72, 2010.
Hirose et al. "X-ray, DTA and Raman studies of monoclinic tridymite and its higher temperature orthorhombic modification with varying temperature." Journal of Mineralogical and Petrological Sciences, vol. 100, pp. 55-69, 2005.
Mao et al. "Volumetric properties and phase relations of silica-thermodynamic assessment." Journal of Alloys and Compunds vol. 327, pp. 253-262, 2001.
Dec. 18, 2018 Office Action Issued in Japanese Patent Application No. 2017-253735.
Feb. 27, 2019 Office Action issued in European Patent Application No. 15 822 789.2.
Aug. 8, 2019 Oral Proceedings Summons issued in European Patent Application No. 15 822 789.2.
Aug. 1, 2019 Office Action issued in Chinese Patent Application No. 201580038214.0.

\* cited by examiner

NEGATIVE ELECTRODE MATERIAL FOR NON-AQUEOUS ELECTROLYTE SECONDARY BATTERY AND METHOD OF PRODUCING NEGATIVE ELECTRODE ACTIVE MATERIAL PARTICLES

TECHNICAL FIELD

The present invention relates to a negative electrode material for a non-aqueous electrolyte secondary battery and a method of producing negative electrode active material particles. The present invention also relates to a negative electrode for a non-aqueous electrolyte secondary battery using the negative electrode material and a non-aqueous electrolyte secondary battery using the negative electrode.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

The negative electrode active material, which is usually made of a carbon material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes ranges from an application type, which is standard for carbon materials, to an integrated type in which the materials are directly accumulated on a current collector.

Use of silicon as a main material of a negative electrode active material, however, expands or shrinks a negative electrode active material when charging or discharging, thereby making the negative electrode active material particle easy to break particularly near its surface layer. In addition, this active material particle produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example). Moreover, a carbon material, an electronic conduction material, is disposed on the surface of silicon oxide particles so that higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). Moreover, a lithium containing material is added to a negative electrode, and pre-doping that decompose lithium and moves the lithium to a positive electrode at a higher negative-electrode potential so that the first charge and discharge efficiency is improved (See Patent Document 6, for example).

Moreover, $SiO_x$ ($0.8 \leq x \leq 1.5$) having a particle size ranging from 1 μm to 50 μm and a carbon material are mixed and calcined at a high temperature so that improved cycle performance is achieved (See Patent Document 7, for example). Moreover, a mole ratio of oxygen to silicon in a negative electrode active material is adjusted in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 8, for example). Moreover, a metal oxide containing lithium is used to improve the battery load characteristic (See Patent Document 9, for example). Moreover, a hydrophobic layer such as a silane compound is formed in the surface layer of a silicon material so that improved cycle performance is achieved (See Patent Document 10, for example).

Moreover, a silicon oxide is used and coated with graphite to give conductivity so that improved cycle performance is achieved (See Patent Document 11, for example). Patent Document 11 describes that a shift value of the graphite coating, which is obtained from a Raman spectrum, has broad peaks at 1330 $cm^{-1}$ and 1580 $cm^{-1}$ and a ratio $I_{1330}/I_{1580}$ of their intensity shows $1.5 < I_{1330}/I_{1580} < 3$.

Moreover, a particle having an Si-microcrystal phase dispersing in a silicon dioxide is used to achieve higher battery capacity and improved cycle performance (See Patent Document 12, for example). Finally, a silicon oxide having a silicon-to-oxygen atomicity ratio of 1:y ($0 < y < 2$) is used to improve overcharge and overdischarge performance (See Patent Document 13, for example).

CITATION LIST

Patent Literature

Patent Document 1: Japanese Unexamined Patent publication (Kokai) No. 2001-185127

Patent Document 2: Japanese Unexamined Patent publication (Kokai) No. 2002-042806
Patent Document 3: Japanese Unexamined Patent publication (Kokai) No. 2006-164954
Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2013-513206
Patent Document 7: Japanese Unexamined Patent publication (Kokai) No. 2008-282819
Patent Document 8: Japanese Unexamined Patent publication (Kokai) No. 2008-251369
Patent Document 9: Japanese Unexamined Patent publication (Kokai) No. 2008-177346
Patent Document 10: Japanese Unexamined Patent publication (Kokai) No. 2007-234255
Patent Document 11: Japanese Unexamined Patent publication (Kokai) No. 2009-212074
Patent Document 12: Japanese Unexamined Patent publication (Kokai) No. 2009-205950
Patent Document 13: Japanese Patent No. 2997741

SUMMARY OF INVENTION

Technical Problem

As described previously, small electronic devices, represented by mobile devices, have been developed to improve their performance and increase their functions. Non-aqueous electrolyte secondary batteries, especially lithium-ion secondary batteries, which are used as main sources of the devices, have been required to increase the battery capacity. The development of non-aqueous electrolyte secondary batteries including negative electrodes mainly using silicon materials have been desired to solve this problem. The non-aqueous electrolyte secondary batteries using silicon materials need the same cycle performance as non-aqueous electrolyte secondary batteries using carbon materials.

The present invention was accomplished in view of the above problems, and an object thereof is to provide a negative electrode material for a non-aqueous electrolyte secondary battery that can increase the battery capacity and improve the cycle performance and the battery initial efficiency. Another object of the present invention is to provide a negative electrode for a non-aqueous electrolyte secondary battery using the negative electrode material and a non-aqueous electrolyte secondary battery using the negative electrode. Further object of the present invention is to provide a method of producing negative electrode active material particles usable for the negative electrode material.

Solution to Problem

To achieve the objects, the present invention provides a negative electrode material for a non-aqueous electrolyte secondary battery, comprising: negative electrode active material particles containing a silicon compound expressed by $SiO_x$ where $0.5 \leq x \leq 1.6$, the silicon compound being coated with a carbon coating layer composed of a carbon component, wherein the negative electrode active material particles contain a $SiO_2$ component having a tridymite structure and exhibit a diffraction peak around 21.825° with a half width (2θ) of 0.15° or less in X-ray diffraction.

The inventive negative electrode material for a non-aqueous electrolyte secondary battery improves conductivity of the negative electrode active material particles by the carbon coating layer composed of a carbon component and thus has good battery performances. Furthermore, the negative electrode active material particles, which at least partially contain a $SiO_2$ component having a tridymite structure and exhibit a diffraction peak around 21.825° attributable to the tridymite structure with a half width (2θ) of 0.15° or less in X-ray diffraction, can reduce irreversible capacity generated at charging and provide excellent battery performances. When the negative electrode active material particles contain the $SiO_2$ component having a tridymite structure like the present invention, the $SiO_2$ component part, which is destabilized with insertion and extraction of lithium, can be previously and effectively modified into another compound, enabling the reduction in irreversible capacity generated at charging. Furthermore, when the diffraction peak around 21.825°, which is attributable to the tridymite structure and obtainable by X-ray diffraction, has a half width (2θ) of 0.15° or less, the $SiO_2$ component can be effectively modified by insertion and extraction of lithium, and thus the irreversible capacity of battery can be further reduced. In addition, electronic devices using a secondary battery containing the inventive negative electrode material can achieve the same effect.

The carbon coating layer preferably exhibits fragments of $C_xH_y$ compound when subjected to TOF-SIMS.

The surface of the carbon coating layer on which the fragments of $C_yH_z$ compound are detected is compatible with a binder, resulting in better battery performances.

A ratio of a $C_4H_9$ peak intensity to a $C_3H_5$ peak intensity of the $C_xH_y$ compound detected in the carbon coating layer preferably ranges from 0.005 to 0.035.

Among the $C_xH_y$ compound detected in the carbon coating layer, the amount of $C_4H_9$ component is particularly correlative to the battery performances. When the ratio of the $C_4H_9$ peak intensity to the $C_3H_5$ peak intensity, i.e., ($C_4H_9$ peak intensity/$C_3H_5$ peak intensity) is 0.005 or more, the capacity retention rate can be more greatly improved. When the $C_4H_9$ peak ratio is 0.035 or less, the initial efficiency and the capacity retention rate can be prevented from decreasing, and excellent battery performances can be achieved.

An amount of the carbon coating layer preferably ranges from 0.5 mass % to 15 mass % with respect to a total amount of the silicon compound and the carbon coating layer.

The carbon coating layer in an amount of 0.5 mass % or more can sufficiently improve the conductivity. When the amount is 15 mass % or less, sufficient battery capacity can be achieved.

The negative electrode active material particles preferably exhibit a volume resistivity ranging from 0.10 Ω·cm to 10 Ω·cm under a load of 20 kN.

The particles that exhibit a volume resistivity of 10 Ω·cm or less under a load of 20 kN have good electrical conductivity and improve the battery performances. The particles that exhibit a volume resistivity of 0.1 Ω·cm or more can surely prevent short circuit and improve safety of battery.

The silicon compound preferably exhibits a diffraction peak having a half width (2θ) of 1.2° or more, the diffraction peak being attributable to an Si(111) crystal plane and obtained by X-ray diffraction, and a crystallite size attributable to the crystal plane is 7.5 nm or less.

A lower crystallinity of a Si component of the silicon compound is better. The silicon compound preferably has the above range of half width (2θ) of the diffraction peak that is attributable to a Si(111) crystal plane and obtained by X-ray diffraction and crystallite size attributable to the crystal plane. The Si component with low crystallinity can improve the battery performances.

The silicon compound preferably satisfies C/D≤1.8 where C is a diffraction peak intensity attributable to a Si(111) crystal plane and D is a diffraction peak intensity attributable to the $SiO_2$ component having a tridymite structure, as obtained by X-ray diffraction.

When the ratio of the $SiO_2$ component having a tridymite structure is relatively large with respect to Si component in the silicon compound, the capacity retention rate and the initial efficiency can be improved.

A Si component of the silicon compound is preferably amorphous.

Use of the silicon compound having low crystalline Si component can improve the battery performances. In addition, such a silicon compound facilitates stable production of a lithium compound.

The negative electrode active material particles preferably contain in their surface layer at least one lithium compound selected from LiF, $Li_2CO_3$, and $Li_2O$. Additionally, the negative electrode active material particles preferably contain in their interior at least one lithium compound selected from $Li_4SiO_4$, $Li_6Si_2O_7$, and $Li_2SiO_3$.

The negative electrode active material particles containing such compounds in their surface layer, interior, or both of them make the present invention more effective.

The lithium compound contained in the surface layer or the interior of the negative electrode active material particles is preferably produced in an electrochemical manner.

The process including an electrochemical manner to produce the lithium compound contained in the silicon compound yields a stable lithium compound.

Furthermore, the present invention provides a negative electrode for a non-aqueous electrolyte secondary battery comprising any one of the inventive negative electrode material.

The negative electrode using the inventive negative electrode material enables a non-aqueous electrolyte secondary battery using this negative electrode to have improved cycle performance and initial charge and discharge performance.

The negative electrode preferably further comprises a carbon-based active material, wherein a median size X of the carbon-based active material and a median size Y of the silicon compound satisfy X/Y≥1.

When the negative electrode contains both the carbon-based negative electrode material and the negative electrode material that includes the silicon compound containing the lithium compound and the carbon coating layer, the negative electrode can be prevented from breaking due to change of its volume. In particular, this effect is effectively exhibited when the carbon-based negative electrode material is equal to or larger than the silicon compound.

The negative electrode preferably satisfies A/B≥0.2 where A is a capacity when the negative electrode is charged with a constant current up to 0.2V and B is a capacity when the negative electrode is charged with a constant current and a constant voltage up to 0V.

When the ratio A/B is 0.2 or more, lithium can be easily diffused in the bulk of the silicon compound. Thus, such a negative electrode can improve both the initial efficiency and the capacity retention rate.

Furthermore, the present invention provides a non-aqueous electrolyte secondary battery comprising any one of the above negative electrode.

The non-aqueous electrolyte secondary battery using the inventive negative electrode can improve the cycle performance and first charge and discharge efficiency.

Furthermore, the present invention provides a method of producing negative electrode active material particles containing a silicon compound expressed by $SiO_x$ where 0.5≤x≤1.6, the method comprising: producing a silicon compound particle expressed by $SiO_x$ where 0.5≤x≤1.6; evaluating whether the produced silicon compound particle contains a $SiO_2$ component having a tridymite structure or not; selecting the silicon compound particle if the silicon compound particle contains the $SiO_2$ component having a tridymite structure and exhibits a diffraction peak around 21.825° with a half width (2θ) of 0.15° or less as measured by X-ray diffraction in the evaluation; and coating the selected silicon compound particle with a carbon coating layer composed of a carbon component to produce negative electrode active material particles.

The method of producing negative electrode material particles including such steps enables production of the negative electrode active material particles contained in the inventive negative electrode material for a non-aqueous electrolyte secondary battery, which contain the $SiO_2$ component having a tridymite structure, exhibit the diffraction peak around 21.825° attributable to the tridymite structure with a half width (2θ) of 0.15° or less in X-ray diffraction, and contain the carbon coating layer composed of a carbon component.

Furthermore, the present invention provides a method of producing negative electrode active material particles containing a silicon compound expressed by $SiO_x$ where 0.5≤x≤1.6, the method comprising the steps of: producing a silicon compound particle expressed by $SiO_x$ where 0.5≤x≤1.6; and coating the silicon compound particle with a carbon coating layer composed of a carbon component, wherein the step of coating with the carbon coating layer includes heating the silicon compound particle at a reaction temperature of 1000° C. or lower such that the silicon compound particle contains a $SiO_2$ component having a tridymite structure and exhibits a diffraction peak around 21.825° with a half width (2θ) of 0.15° or less in X-ray diffraction.

The method of producing negative electrode material particles including such steps enables production of the negative electrode active material particles contained in the inventive negative electrode material for a non-aqueous electrolyte secondary battery, which contain the $SiO_2$ component having a tridymite structure, exhibit the diffraction peak around 21.825° attributable to the tridymite structure with a half width (2θ) of 0.15° or less in X-ray diffraction, and contain the carbon coating layer composed of a carbon component.

Advantageous Effects of Invention

The inventive negative electrode material for a non-aqueous electrolyte secondary battery can improve conductivity of the negative electrode active material particles by the carbon coating layer composed of a carbon component and thus has good battery performances. Furthermore, the negative electrode active material particles, which at least partially contain a $SiO_2$ component having a tridymite structure and exhibit a diffraction peak around 21.825° attributable to the tridymite structure with a half width (2θ) of 0.15° or less in X-ray diffraction, can reduce irreversible capacity generated at charging and provide excellent battery performances. In addition, electronic devices using a secondary battery containing the inventive negative electrode material can achieve the same effect.

Moreover, when the negative electrode active material particles contain the $SiO_2$ component having a tridymite structure, the $SiO_2$ component part, which is destabilized with insertion and extraction of lithium, can be previously and effectively modified into another compound, enabling the reduction in irreversible capacity generated at charging. Furthermore, when the diffraction peak around 21.825°, which is attributable to the tridymite structure and obtainable by X-ray diffraction, has a half width (2θ) of 0.15° or less, the $SiO_2$ component can be effectively modified by insertion and extraction of lithium, and thus the irreversible capacity of battery can be reduced.

Moreover, the negative electrode active material particles contained in such a negative electrode material for a non-aqueous electrolyte secondary battery can be produced by the inventive method of producing negative electrode active material particles.

DESCRIPTION OF EMBODIMENTS

Hereinafter, embodiments of the present invention will be described. The description is given in the following order.
1. Negative electrode for non-aqueous electrolyte secondary battery
2. Non-aqueous electrolyte secondary battery (laminate film lithium-ion secondary battery)
<1. Negative Electrode for Non-Aqueous Electrolyte Secondary Battery>

Figure 1:
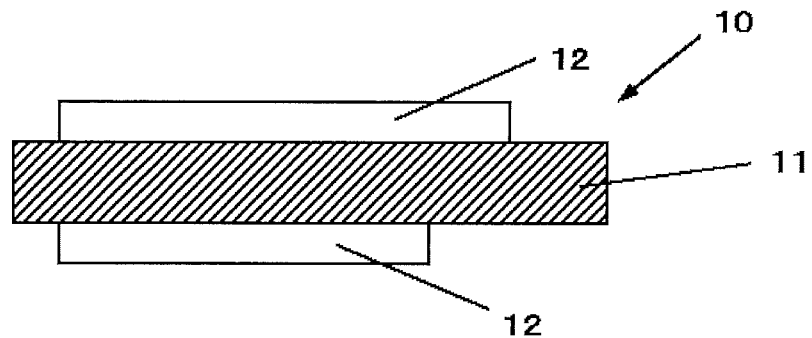
FIG. 1 is a cross-sectional view of a configuration of a negative electrode for a non-aqueous electrolyte secondary battery according to an embodiment of the invention.

A negative electrode for a non-aqueous electrolyte secondary battery using the inventive negative electrode material for a non-aqueous electrolyte secondary battery will be now described. FIG. 1 shows the cross-section of a negative electrode for a non-aqueous electrolyte secondary battery (simply referred to as a negative electrode below) according to an embodiment of the invention.
[Configuration of Negative Electrode]

As shown in FIG. 1, the negative electrode 10 has a negative electrode active material layer 12 on a negative electrode current collector 11. The negative electrode active material layer 12 may be disposed on one side or both sides of the negative electrode current collector 11. The negative electrode current collector 11 is not necessarily needed in a negative electrode using the inventive negative electrode active material.
[Negative Electrode Current Collector]

The negative electrode current collector 11 is made of a highly conductive and mechanically strong material. Examples of the conductive material used for the negative electrode current collector 11 include copper (Cu) and nickel (Ni). Such conductive materials preferably have inability to form an intermetallic compound with lithium (Li).

The negative electrode current collector 11 preferably contains carbon (C) and sulfur (S) besides the main element because these elements improve the physical strength of the negative current collector. In particular, when the active material layer contains a material expandable at charging, the current collector containing the above elements can inhibit deformation of the electrodes and the current collector itself. The amount of the contained elements is preferably, but not particularly limited to, 100 ppm or less. This amount enables effective inhibition of the deformation.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.
[Negative Electrode Active Material Layer]

The negative electrode active material layer 12 contains multiple negative electrode active material particles that can occlude and emit lithium ions and may further contain other materials such as a negative electrode binder or a conductive additive depending on battery design. The inventive negative electrode material for a non-aqueous electrolyte secondary battery can be used for the negative electrode active material layer 12.

The negative electrode active material particles used in the inventive negative electrode material each contain a silicon compound expressed by $SiO_x$ (0.5≤x≤1.6) that can occlude and emit lithium ions and a carbon coating layer composed of a carbon component that coats the silicon compound. Furthermore, the negative electrode active material particles contain a $SiO_2$ component having a tridymite structure and exhibit a diffraction peak around 21.825° with a half width (2θ) of 0.15° or less in X-ray diffraction. This structure can be observed by photography of transmission electron microscope-energy dispersive X-ray spectroscopy (TEM-EDX). Occluding and emitting lithium ions may be done in at least a part of the carbon coating layer of carbon component.

The negative electrode active material particles used in the inventive negative electrode material are a silicon oxide material containing a silicon compound ($SiO_x$, where 0.5≤x≤1.6); a preferable composition of the silicon compound is that x is close to 1. The reason is that this composition enables high cycle performance. The present invention does not necessarily intend a silicon material composition of 100% but permits a silicon material containing a minute amount of impurities.

As described above, the negative electrode active material particles used in the inventive negative electrode material are characterized by containing a $SiO_2$ component having a tridymite structure. The $SiO_2$ component having a tridymite structure can be formed by changing the temperature of materials to be vaporized used as raw materials of the silicon compound when the silicon compound is produced and thereby controlling the $SiO_2$ structure to be deposited.

Thus, when the negative electrode active material particles contain a $SiO_2$ component having a tridymite structure, the $SiO_2$ component can be effectively modified by insertion and extraction of lithium, and thus the irreversible capacity generated at charging can be significantly reduced.

Furthermore, the negative electrode active material particles in the present invention exhibit a diffraction peak around 21.825°, which is attributable to the $SiO_2$ component having a tridymite structure, with a half width (2θ) of 0.15° or less in X-ray diffraction. The half width (2θ) is more preferably 0.1° or less. If the diffraction peak around 21.825°, which is attributable to the $SiO_2$ component having a tridymite structure, has a half width exceeding 0.15°, the $SiO_2$ component cannot be effectively modified in the bulk modification by insertion and extraction of lithium, and thus the irreversible capacity cannot be reduced.

In the present invention, a lower crystallinity of a Si component of the silicon compound is better. The silicon compound preferably exhibits a diffraction peak having a half width (2θ) of 1.2° or more that is attributable to an Si(111) crystal plane and obtained when X-ray diffraction is performed on the silicon compound, and a crystallite size of 7.5 nm or less that is attributable to the crystal plane. In particular, reduction of Si crystal inhibits the degradation of the battery performances due to the Si crystal and facilitates stable production of a lithium compound.

Additionally, the silicon compound preferably satisfies C/D≤1.8 where C is a diffraction peak intensity attributable to a Si(111) crystal plane and D is a diffraction peak intensity attributable to the $SiO_2$ component having a tridymite structure, as obtained by X-ray diffraction. A smaller ratio C/D is better. In particular, the ratio C/D is preferably substantially 0. When the ratio of the $SiO_2$ component having a tridymite structure is relatively large with respect to a Si component in the silicon compound, the capacity retention rate and the initial efficiency can be improved. When the ratio C/D is substantially 0, i.e., when the Si component is amorphous while the silicon compound contains the $SiO_2$ component having a tridymite structure, the capacity retention rate and the initial efficiency can be more greatly improved.

As described above, the negative electrode active material particles are coated with the carbon coating layer composed of a carbon component. The amount of the carbon coating layer preferably ranges from 0.5 mass % to 15 mass % with respect to the total amount of the silicon compound and the carbon coating layer. The carbon coating layer in an amount of 0.1 mass % or more can sufficiently improve the conductivity. An amount of 15 mass % or less prevents the carbon amount from excessively increasing, thus enabling sufficient battery capacity. The coating method with a carbon component is preferably, but not particularly limited to, sugar carbonization or pyrolysis of hydrocarbon gas, for these methods can improve the carbon coverage of the carbon coating layer on the negative electrode active material particles.

The carbon coating layer preferably exhibits fragments of $C_xH_y$ compound when subjected to TOF-SIMS. The surface of the carbon coating layer on which the fragments of $C_yH_z$ compound are detected is compatible with a binder, resulting in better battery performances.

A ratio of a $C_4H_9$ peak intensity to a $C_3H_5$ peak intensity of the $C_xH_y$ compound detected in the carbon coating layer preferably ranges from 0.005 to 0.035. Among the $C_xH_y$ compound detected in the carbon coating layer, the amount of $C_4H_9$ component is particularly correlative to the battery performances. When the $C_4H_9$ peak ratio is 0.005 or more, the capacity retention rate can be more greatly improved. When the $C_4H_9$ peak ratio is 0.035 or less, the initial efficiency and the capacity retention rate can be prevented from decreasing, and excellent battery performances can be achieved.

The negative electrode active material particles preferably exhibit a volume resistivity ranging from 0.10 Ω·cm to 10 Ω·cm under a load of 20 kN. The particles that exhibit a volume resistivity of 10 Ω·cm or less under a load of 20 kN have good electrical conductivity and improve the battery performances. The particles that exhibit a volume resistivity of 0.1 Ω·cm or more can surely prevent short circuit and improve safety of battery.

The negative electrode active material particles are preferably surrounded with a particulate carbon compound having a median size smaller than that of the silicon compound. This allows improvement in electrical conductivity between the negative electrode active material particles. The carbon compound can be around the negative electrode active material particles by, for example, physically mixing with the negative electrode active material particles.

The median size of the silicon compound preferably ranges from 0.5 μm to 20 μm, but not particularly limited thereto. This range makes it easy to occlude and emit lithium ions and inhibits the breakage of the particles at charging and discharging. A median size of 0.5 μm or more then prevents the area surface from excessively increasing and can thus prevent an increase in battery irreversible capacity; a median size of 20 μm or less inhibits the breakage of the particles and the creation of a new surface.

The negative electrode active material particles contained in the inventive negative electrode material are preferably a material in which a part of $SiO_2$ components formed inside the silicon compound is selectively modified into a lithium compound. Among the lithium compounds formed inside the silicon compound, $Li_4SiO_4$, $Li_6Si_2O_7$, and $Li_2SiO_3$ especially have good performance.

The lithium compound can be quantified by Nuclear Magnetic Resonance (NMR) and X-ray Photoelectron Spectroscopy (XPS). XPS and NMR measurements can be performed, for example, under the following conditions. XPS Apparatus: an X-ray photoelectron spectroscopy apparatus
   X-ray Source: a monochromatic Al-Kα ray
   X-ray Spot Diameter: 100 μm
   Ar-ion Sputtering Gun Conditions: 0.5 kV, 2 mm×2 mm
$^{29}$Si-MAS-NMR
   Apparatus: a 700-NMR spectroscope made by Bruker Corp.
   Probe: a 4-mm-HR-MAS rotor, 50 μL
   Sample Rotation Speed: 10 kHz
   Temperature of Measurement Environment: 25° C.

The formation of the selective compound, i.e., the modification of the silicon compound is preferably carried out in an electrochemical manner.

Such modification (bulk modification) to produce the negative electrode active material particles can reduce or prevent the lithium compound formation in an Si region, yielding a substance stable in the air, water slurry, or solvent slurry. Moreover, electrochemical modification enables production of a more stable lithium compound than thermal modification (thermal doping method), in which the compound is randomly modified.

$Li_4SiO_4$, $Li_6Si_2O_7$, and $Li_2SiO_3$ can improve the performance when at least one of them is formed in the bulk of the silicon compound; the combination of two or more of them can further improve the performance.

Additionally, the silicon compound preferably contains on its surface at least one lithium compound selected from $Li_2CO_3$, $Li_2O$, and LiF.

Above all, when a fluorine compound such as LiF is formed in the outermost surface layer of the silicon compound, the powder storage property is dramatically improved. In particular, the coverage thereof is preferably 30% or more. The most preferable material is LiF. The most preferable coating method is an electrochemical method, though not particularly limited thereto.

The negative electrode binder may be, for example, one or more of a polymer material and a synthetic rubber. Examples of the polymer material include polyvinylidene fluoride, polyimide, polyamideimide, aramid, polyacrylic acid, lithium polyacrylate, and carboxymethyl cellulose.

Examples of the synthetic rubber include styrene-butadiene rubber, a fluorinated rubber, and an ethylene-propylene-diene.

Examples of the negative electrode conductive additive include carbon materials such as carbon black, acetylene black, graphite, ketjen black, carbon nanotube, carbon nanofiber, and a combination thereof.

The negative electrode active material layer may be produced as a mixture of the inventive negative electrode material and a carbon material (a carbon-based active material). The negative electrode active material layer mixing the inventive silicon-based negative electrode material and a carbon-based negative electrode material can reduce its electrical resistance and a stress due to its expansion at charging. Examples of the carbon-based negative electrode material include pyrolytic carbons, cokes, glassy carbon fiber, a fired organic polymeric compound, and carbon black.

The median size X of the carbon-based active material and the median size Y of the silicon compound preferably satisfy $X/Y \geq 1$. When the negative electrode contains both the carbon-based negative electrode material and the negative electrode material that includes the silicon compound containing the lithium compound and the carbon coating layer, the negative electrode can be prevented from breaking due to change of its volume. In particular, this effect is effectively exhibited when the carbon-based negative electrode material is equal to or larger than the silicon compound.

The negative electrode preferably satisfies $A/B \geq 0.2$ where A is a capacity when the negative electrode is charged with a constant current up to 0.2V and B is a capacity when the negative electrode is charged with a constant current and a constant voltage up to 0V. When the ratio A/B is 0.2 or more, both the initial efficiency and the capacity retention rate can be improved. The capacities A and B can be measured, specifically, by the following procedure.

Firstly, a coin cell is produced. The coin cell is charged with a lithium counter electrode in CC (constant current) mode (current density: $0.2$ mA/cm$^2$) up to 0(V), followed by CV (constant voltage) mode from 0(V). When the current becomes $0.04$ mA/cm$^2$, the charging is terminated. The coin cell is then discharged with a constant current density of $0.2$ mA/cm$^2$ until the cell voltage reaches 1.2V. That is, after charging, discharging is performed in CC (constant current) mode until the cell voltage reaches 1.2V. In this operation, the capacity A at charging with a constant current up to 0.2V and the capacity B at charging with a constant current and a constant voltage up to 0V can be measured.

The negative electrode active material layer may be formed by, for example, an application method. The application method is to mix the negative electrode active material particles and the binders, in addition to the conductive additive and the carbon material as needed, and disperse the resultant mixture into an organic solvent or water to apply the resultant to a subject.

[Method of Producing Negative Electrode]

The method of producing the inventive negative electrode will be now described.

The method of producing negative electrode active material particles contained in the inventive negative electrode material for a non-aqueous electrolyte secondary battery is first described. The method begins with heating a raw material capable of generating a silicon oxide gas under an inert gas atmosphere or a reduced pressure at a temperature ranging from 900° C. to 1600° C. to produce the silicon oxide gas. The raw material is a mixture of metallic silicon powder and silicon dioxide powder. The mole ratio of the mixture preferably satisfies 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment after the production. The produced gas is deposited on an adsorption plate. The temperature in the reactor is decreased to 100° C. or lower, and a deposit is taken out. The deposit is then pulverized with a ball mill or a jet mill to form powder.

In the present invention, the silicon oxide powder (the silicon compound particle) thus produced is evaluated whether this particle contains a SiO$_2$ component having a tridymite structure or not. In addition, the half width (2θ) of the diffraction peak around 21.825° obtained by X-ray diffraction is calculated. The purpose of the evaluation and the measurement is to select a silicon compound particle that contains the SiO$_2$ component having a tridymite structure and exhibits the diffraction peak around 21.825° with a half width (2θ) of 0.15° or less as measured by X-ray diffraction. If the reaction temperature is 1000° C. or lower in a subsequent step of coating with a carbon coating layer as described later, this selecting step may be eliminated.

The obtained powder material (the silicon compound particle) is then coated with a carbon coating layer.

Thermal CVD is desirably used to form the carbon coating layer on the obtained powder material. This thermal CVD is to fill a furnace in which the silicon oxide powder is placed with a hydrocarbon gas and heat the interior of the furnace. The reaction temperature is preferably, but not particularly limited to, 1200° C. or lower. A reaction temperature of 1000° C. or lower allows the silicon compound particle to surely contain the SiO$_2$ component having a tridymite structure and exhibit the diffraction peak around 21.825° with a half width (2θ) of 0.15° or less in X-ray diffraction. Thus, when the reaction temperature is 1000° C. or lower in the step of coating with a carbon coating layer, the silicon oxide powder that contains the SiO$_2$ component having a tridymite structure and satisfies the above half width can be surely obtained, and the selection is not necessarily needed after producing the silicon oxide powder. In addition, even when the reaction temperature is more than 1000° C., the negative electrode active material particles contained in the inventive negative electrode material for a non-aqueous electrolyte secondary battery can be obtained by selecting, after formation of the carbon coating layer, a silicon compound particle that contains the SiO$_2$ component having a tridymite structure and exhibits the diffraction peak around 21.825° with a half width (2θ) of 0.15° or less in X-ray diffraction, and using the selected silicon compound particle as the negative active material particles. More preferable reaction temperature is 950° C. or lower. This range enables inhibition of disproportionation of the silicon compound particle. The hydrocarbon gas preferably has a composition of $C_nH_m$ where $3 \geq n$, but is not particularly limited thereto, for this composition enables reduction in production cost and improvement in physical properties of a pyrolysis product.

Figure 2:
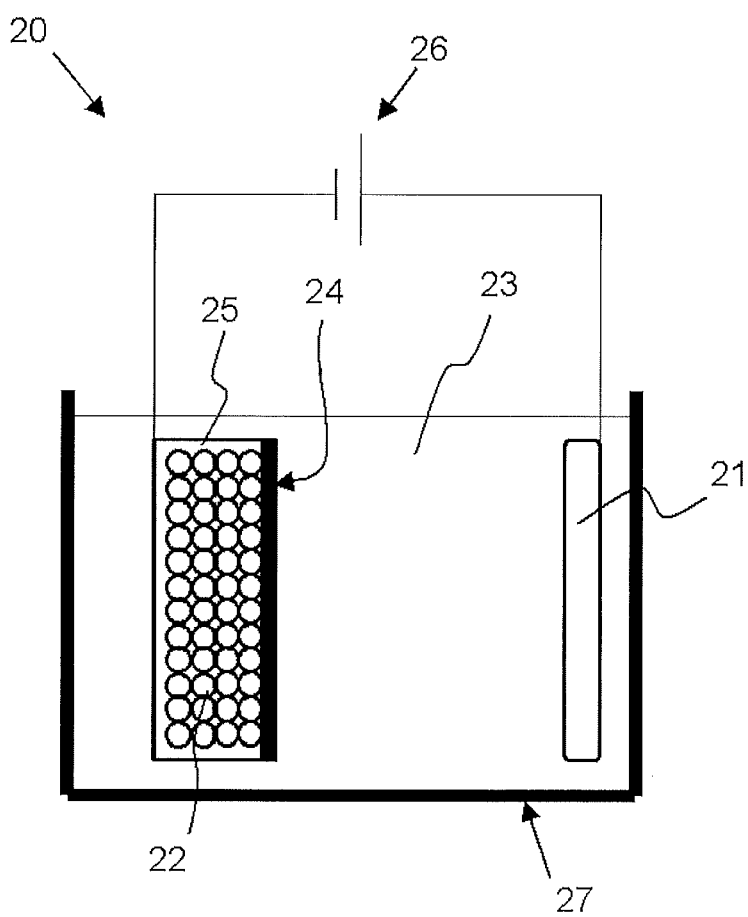
FIG. 2 is a simplified view of a bulk modification apparatus in an embodiment of the present invention.

The bulk modification is preferably performed by inserting and extracting lithium in an electrochemical manner. The bulk modification can be performed with, for example, a bulk modification apparatus 20 shown in FIG. 2 although the apparatus structure is not particularly limited. The bulk modification apparatus 20 includes a bath 27 filled with an organic solvent 23, a positive electrode 21 (lithium source) provided within the bath 27 and connected to one terminal of a power source 26, a powder storage container 25 provided within the bath 27 and connected to the other terminal of the power source 26, and a separator 24 provided between the positive electrode 21 and the powder storage container 25. In the powder storage container 25, silicon compound powder 22 is stored.

In the bulk modification treatment, when a fluorine compound is formed on the surface, the fluorine compound is preferably formed by changing voltage and temperature conditions. This yields a denser film. In particular, fluorinated lithium is preferably formed by keeping the temperature at 45° C. or higher during insertion and extraction of lithium.

The existence of the carbon coating layer enables reduction in potential distribution and uniform control.

Examples of the organic solvent 23 in the bath 27 include ethylene carbonate, propylene carbonate, dimethyl carbonate, diethyl carbonate, ethylmethyl carbonate, fluoromethylmethyl carbonate, and difluoromethylmethyl carbonate. Examples of electrolyte salt contained in the organic solvent 23 include lithium hexafluorophosphate ($LiPF_6$) and lithium tetrafluoroborate ($LiBF_4$).

As the positive electrode 21, a lithium foil or a Li-containing compound may be used. Examples of the Li-containing compound include lithium carbonate and lithium oxide.

Subsequently, the negative electrode active material particles are mixed with the negative electrode binder and other materials such as conductive additives. The resultant negative electrode mixture is then mixed with an organic solvent or water to form slurry.

The mixture slurry is then applied to the surface of a negative electrode current collector and dried to form a negative electrode active material layer 12 shown in FIG. 1. If necessary, heating press may be performed.

This negative electrode, in which the $SiO_2$ component having a tridymite structure in the bulk is modified into a stable lithium compound, can improve the battery initial efficiency. Moreover, this active material is stable even with the increase in cycles and thus can improve its stability. Higher effect can be achieved by forming lithium silicate in the bulk.

In addition, coating with the carbon coating layer composed of a carbon component makes the compound condition in the bulk more uniform, and the fluorine compound on the surface layer improves stability of the active material, yielding higher effect.

In particular, a negative electrode current collector containing carbon and sulfur in an amount of 90 ppm or less is more effective.

<2. Lithium-Ion Secondary Battery>

A lithium-ion secondary battery will be now described as an illustrative example of a non-aqueous electrolyte secondary battery using the above negative electrode.

[Configuration of Laminate Film Secondary Battery]

Figure 3:
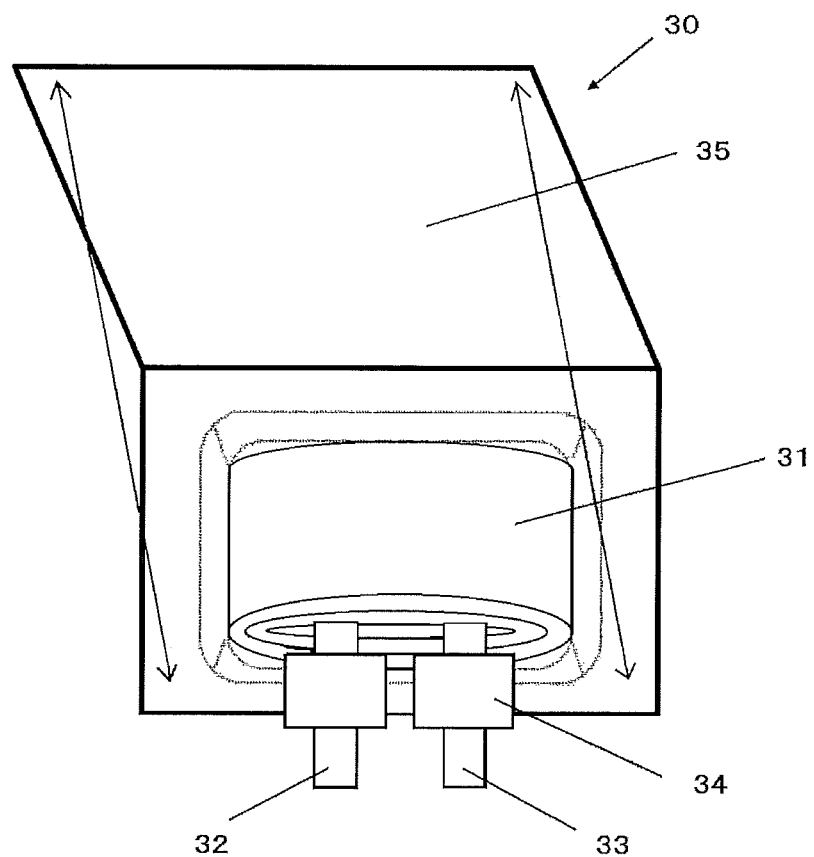
FIG. 3 is an exploded view of a laminate film type of secondary battery according to an embodiment of the invention.

The laminate film secondary battery 30 shown in FIG. 3 includes a wound electrode body 31 interposed between sheet-shaped outer parts 35. The wound body are formed by winding a positive electrode, a negative electrode, and a separator disposed between these electrodes. The electrode body may also be composed of a laminated part of the positive and negative electrodes, and a separator disposed between these electrodes. The electrode bodies of both types have a positive electrode lead 32 attached to the positive electrode and a negative electrode lead 33 attached to the negative electrode. The outermost circumference of the electrode bodies is protected by a protecting tape.

The positive electrode lead and the negative electrode lead, for example, extends from the interior of the outer parts 35 toward the exterior in one direction. The positive electrode lead 32 is made of, for example, a conductive material such as aluminum; the negative electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edges of their fusion-bond layers such that each fusion-bond layer faces the electrode body 31. The fusion-bond layer may be, for example, a film such as a polyethylene or polypropylene film; the metallic layer may be aluminum foil; the protecting layer may be, for example, nylon.

The space between the outer parts 35 and the positive and negative electrode leads is filled with close adhesion films 34 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 1, for example.

The positive electrode current collector is made of, for example, a conductive material such as aluminum.

The positive electrode active material layer contains a positive electrode material that can occlude and emit lithium ions or a combination of positive electrode materials, and may contain a binder, a conductive additive, a dispersing agent, or other materials according to design. The same detailed description as described for the negative electrode binders and negative electrode conductive additive, for example, is then given for this binder and this conductive additive.

The positive electrode material is preferably a compound containing lithium. Examples of the lithium-containing compound include a complex oxide composed of lithium and transition metal elements, and a phosphoric acid compound containing lithium and transition metal elements. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \leq x \leq 1.10$ and $0.05 \leq y \leq 1.10$.

Examples of the complex oxide composed of lithium and transition metal elements include a lithium cobalt complex oxide ($Li_xCoO_2$), a lithium nickel complex oxide ($Li_xNiO_2$). Examples of the phosphoric acid compound containing lithium and transition metal elements include a lithium iron phosphoric acid compound ($LiFePO_4$), a lithium iron manganese phosphoric acid compound ($LiFe_{1-u}Mn_uPO_4$ ($0<u<1$)). Use of these positive electrode materials enables a higher battery capacity and excellent cycle performance.

[Negative Electrode]

The negative electrode is configured as in the above negative electrode 10 for a lithium-ion secondary battery shown in FIG. 1, and, for example, has the negative electrode active material layer 12 disposed on both faces of the current collector 11. The negative electrode preferably has a negative electrode charge capacity larger than a battery charge capacity (electrical capacitance) provided by the positive electrode active material, for this negative electrode itself can inhibit the precipitation of lithium metal.

The positive electrode active material layer is formed partially on both faces of the positive electrode current collector. The same is true of the negative electrode active material layer. Such a negative electrode may have, for example, an area at which the positive electrode active material layer is not present on the surface of the positive electrode current collector that the negative electrode active material layer faces. This area permits stable battery design.

This non-facing area, i.e., the area at which the positive and negative electrode active material layers do not face one another is hardly affected by charging and discharging. The status of the negative electrode active material layer is consequently maintained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, carbonic acid propylmethyl ester, 1,2-dimethoxyethane, and tetrahydrofuran. Among them, ethylene carbonate, propylene carbonate, dimethyl carbonate, diethyl carbonate, or ethylmethyl carbonate, or the combination thereof is preferable. Such solvent enables better performances. The combination of a viscous solvent, such as ethylene carbonate or propylene carbonate, and a non-viscous solvent, such as dimethyl carbonate, diethyl carbonate or ethylmethyl carbonate allows much better performances, for such solvents improve the dissociation of electrolyte salt and ionic mobility.

The solvent preferably contains an unsaturated carbon bond cyclic carbonate as an additive, for this enables formation of a stable coating on a negative electrode at charging and discharging and inhibition of a decomposition reaction of the electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolyte. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent preferably ranges from 0.5 mol/kg to 2.5 mol/kg. This content enables high ionic conductivity.

[Manufacture of Laminate Film Secondary Battery]

Firstly, a positive electrode is produced with the above positive electrode material as follows. A positive electrode mixture is created by mixing the positive electrode material with as necessary the binder, the conductive additive, and other materials, and dispersed in an organic solvent to form slurry of the positive electrode mixture. This slurry is then applied to a positive electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The compression may be repeated multiple times.

Secondly, a negative electrode active material layer is formed on a negative electrode current collector to produce a negative electrode through the same procedure as in the above production of the negative electrode 10 for a lithium-ion secondary battery.

When the positive electrode and the negative electrode are produced, the active material layers are formed on both faces of the positive and negative electrode current collector. In both the electrodes, the length of these active material layers formed on the faces may differ from one another (See FIG. 1).

Then, an electrolyte is prepared. With ultrasonic welding, the positive electrode lead 32 is attached to the positive electrode current collector and the negative electrode lead 33 is attached to the negative electrode current collector. The positive and negative electrodes and the separator interposed therebetween are stacked or wound to produce the electrode body 31 and a protecting tape is stuck to the outermost circumference of the body. The electrode body is flattened. The film-shaped outer part 35 is folded in half to interpose the electrode body therebetween. The insulating portions of the outer part are stuck to one another by heat sealing such that one of the four sides is opened to house the electrode body. The close adhesion films are inserted between the outer part and the positive and negative electrode leads. The prepared electrolyte is introduced from the open side in a prescribed amount to perform the impregnation of the electrolyte under a vacuum. The open side is stuck by vacuum heat sealing.

In this manner, the laminate film secondary battery 30 can be produced.

EXAMPLE

Hereinafter, the present invention will be more specifically described with reference to examples and comparative examples, but the present invention is not limited thereto.

Example 1-1

A laminate film secondary battery 30 shown in FIG. 3 was produced by the following procedure.

The procedure began with the production of a positive electrode. Positive electrode active materials of 95 mass parts of lithium cobaltate ($LiCoO_2$), 2.5 mass parts of a positive electrode conductive additive, and 2.5 mass parts of a positive electrode binder (polyvinylidene fluoride, PVDF) were mixed to produce a positive electrode mixture. The positive electrode mixture was dispersed in an organic solvent (N-methyl-2-pyrrolidone, NMP) to form paste slurry. The slurry was applied to both faces of a positive electrode current collector with a coating apparatus having a die head and dried with a drying apparatus of hot-air type. The positive electrode current collector had a thickness of 15 μm. The resultant was finally compressed with a roll press.

Next, a negative electrode was produced as described below.

The negative electrode active material particles contained in the inventive negative electrode material were produced by the following procedure.

Firstly, a mixed raw material (a material to be vaporized) of metallic silicon and silicon dioxide was placed in a reactor and evaporated under a vacuum atmosphere of 10 Pa to deposit the evaporated material on an adsorption plate. The deposit was sufficiently cooled and then taken out to pulverize the deposit with a ball mill. After adjusting the particle size of the obtained powder, the powder was coated with a carbon coating by thermal CVD. The reaction temperature of the thermal CVD was 980° C. The produced powder was bulk-modified by an electrochemical method in a mixed solvent having an ethylene-carbonate-to-dimethyl-carbonate volume ratio of 3:7, including 1.3 mol/kg of an electrolyte salt. The negative electrode active material particles were thus produced. The produced negative electrode active material particles exhibited a volume resistivity of 0.18 Ω·cm under a load of 20 kN.

The negative electrode active material particles had the silicon compound expressed by $SiO_x$ where x=0.9. The silicon compound had a median size $D_{50}$ of 4 μm. The amount of the carbon coating layer was 5 mass % with respect to the total amount of the silicon compound and the carbon coating layer. The diffraction peak around 21.825° had a half width (2θ) of 0.10° in X-ray diffraction.

Then, the negative electrode active material particles and natural graphite were blended at a weight ratio of 50:50. The blended active material, a first conductive additive, a second conductive additive, a precursor of negative electrode binder (polyimide) were mixed at a dry-weight ratio of 80-83:10:2:5-8. The mixture was diluted with NMP to form slurry of a negative electrode mixture. The NMP was used as a solvent of polyamic acid. The negative electrode mixture slurry was then applied to both faces of a negative electrode current collector with a coating apparatus and dried. The negative electrode current collector used was an electrolytic copper foil, having a thickness of 15 μm. The resultant current collector was finally fired at 400° C. for 1 hour under a vacuum atmosphere. In this manner, a negative electrode binder (polyimide) was formed.

A solvent was produced by mixing 4-fluoro-1,3-dioxolan-2-one (FEC), ethylene carbonate (EC), and dimethyl carbonate (DMC) and an electrolyte salt (lithium hexafluorophosphate, $LiPF_6$) was dissolved therein to produce an electrolyte. The composite of the solvent was FEC:EC:DMC=10:20:70 in term of the volume ratio. The content of the electrolyte salt in the solvent was 1.2 mol/kg.

The secondary battery was assembled by the following procedure. An aluminum lead was first ultrasonic-welded to one end of the positive electrode current collector. A nickel lead was welded to one end of the negative electrode current collector. The positive electrode, a separator, the negative electrode, a separator were then stacked in this order and wound in a longitudinal direction to obtain a wound electrode body. The end of the wound part was fixed by a PET protecting tape. The separators were a 12-μm laminate film composed of a porous polyethylene film interposed between porous polypropylene films. The electrode body was interposed between outer parts and the outer circumferences except one side were heat-sealed to house the electrode body therein. The outer parts were an aluminum laminate film composed of a nylon film, aluminum foil, and a polypropylene film stacked. The prepared electrolyte was poured from an open side to perform the impregnation of the electrolyte under a vacuum atmosphere. The open side was stuck by heat sealing.

Comparative Examples 1-1 to 1-3

A secondary battery was produced as in example 1-1 except that the silicon compound in the negative electrode material did not contain the $SiO_2$ component having a tridymite structure. The $SiO_2$ component structure in comparative example 1-1 contained an amorphous structure. The $SiO_2$ component structure in comparative example 1-2 contained quartz. The $SiO_2$ component structure in comparative example 1-3 contained cristobalite.

The silicon compounds in comparative examples 1-1 to 1-3 had the following physical properties: the silicon compound expressed by $SiO_x$ had an x-value of 0.9; the silicon compound had a median size $D_{50}$ of 4 μm.

In addition, the amount of the carbon coating layer in the negative electrode active material particles was 5 mass % with respect to the total amount of the silicon compound and the carbon coating layer.

The cycle performance and the first charge and discharge performance of the secondary batteries in example 1-1 and comparative examples 1-1 to 1-3 were investigated. The result is given in Table 1.

The cycle performance was investigated in the following manner. First, two cycles of charging and discharging were performed at 25° C. to stabilize the battery, and the discharge capacity in the second cycle was measured. Next, the cycle of charging and discharging was repeated until the total number of cycles reached 100 cycles, and the discharge capacity was measured every cycle. Finally, the capacity retention rate (hereinafter, also simply referred to as retention rate) was calculated by dividing the discharge capacity in the 100-th cycle by the discharge capacity in the second cycle and multiplying the resultant by 100 to express as a percent. The cycle conditions were as follows: The secondary batteries were charged with a constant current of 2.5 mA/cm$^2$ until the voltage reached 4.2V. After this voltage reached 4.2V, the charging was continued while the current density became 0.25 mA/cm$^2$ at a constant voltage of 4.2V. The batteries were then discharged with a constant current density of 2.5 mA/cm$^2$ until the voltage reached 2.5V.

The first charge and discharge performance was investigated by calculating the first efficiency (also referred to as initial efficiency below). The first efficiency was calculated by the following expression:

First Efficiency (%)=(First Discharge Capacity/First Charge Capacity)×100

The atmosphere temperate was the same as the cycle performance was investigated. The charging and discharging conditions were 0.2 times the conditions of the investigation of the cycle performance.

TABLE 1

SiOx (x = 0.9), D50 = 4 µm, Amount
of carbon coating 5 wt %, Polyimide, FEC:EC:DMC (1:2:7
vol %) LiPF$_6$ 1.2 mol/kg, Positive electrode LiCoO$_2$

|  | SiO$_2$ structure | Retention rate % | Initial efficiency % |
| --- | --- | --- | --- |
| Comparative example 1-1 | amorphous | 78.0 | 64.0 |
| Comparative example 1-2 | quartz | 76.0 | 65.5 |
| Comparative example 1-3 | cristobalite | 69.0 | 66.0 |
| Example 1-1 | tridymite structure is contained | 80.1 | 67.5 |

As shown in Table 1, the battery performances changed in response to the variation in the SiO$_2$ component structure contained in the silicon compound. When the SiO$_2$ component having a tridymite structure was contained as in example 1-1, the capacity retention rate and the initial efficiency were improved. The SiO$_2$ component structure could be observed by XRD. In the following examples and comparative examples, the silicon compound that contains the SiO$_2$ component having a tridymite structure was used.

Examples 2-1 to 2-4 and Comparative Examples 2-1 and 2-2

A secondary battery was produced as in example 1-1 except that oxygen amount in the bulk of the silicon compound was adjusted. The amount of accumulated oxygen was adjusted by changing the temperature and the ratio of raw materials to be vaporized. The x-value of the silicon compound expressed by SiO$_x$ in examples 2-1 to 2-4 and comparative examples 2-1 and 2-2 is given in Table 2.

The silicon compounds in examples 2-1 to 2-4 and comparative examples 2-1 and 2-2 had the following physical properties: the silicon compound had a median size D$_{50}$ of 4 µm; the silicon compound contained the SiO$_2$ component having a tridymite structure; the diffraction peak around 21.825° had a half width (2θ) of 0.10° in X-ray diffraction.

Moreover, in examples 2-1 to 2-4 and comparative examples 2-1 and 2-2, the amount of the carbon coating layer was 5 mass % with respect to the total amount of the silicon compound and the carbon coating layer.

The cycle performance and the first charge and discharge performance of the secondary batteries in examples 2-1 to 2-4 and comparative examples 2-1 and 2-2 were investigated. The result is given in Table 2.

TABLE 2

SiOx, D50 = 4 µm, Tridymite structure, Amount
of carbon coating 5 wt %, Polyimide, FEC:EC:DMC (1:2:7 vol %)
LiPF$_6$ 1.2 mol/kg, Positive electrode LiCoO$_2$

|  | SiOx | Retention rate % | Initial efficiency % |
| --- | --- | --- | --- |
| Example 1-1 | x = 0.9 | 80.1 | 67.5 |
| Comparative example 2-1 | x = 0.3 | 65.0 | 72.0 |
| Example 2-1 | x = 0.5 | 73.5 | 70.0 |
| Example 2-2 | x = 0.7 | 77.5 | 68.5 |
| Example 2-3 | x = 1.2 | 80.1 | 67.3 |
| Example 2-4 | x = 1.6 | 80.1 | 67.0 |
| Comparative example 2-2 | x = 1.8 | — | — |

TABLE 2-continued

SiOx, D50 = 4 µm, Tridymite structure, Amount
of carbon coating 5 wt %, Polyimide, FEC:EC:DMC (1:2:7 vol %)
LiPF$_6$ 1.2 mol/kg, Positive electrode LiCoO$_2$

|  | SiOx | Retention rate % | Initial efficiency % |
| --- | --- | --- | --- |

As shown in Table 2, when the oxygen amount was lack (comparative example 1-1, x=0.3), the capacity retention rate significantly degraded although the initial efficiency was improved. When the oxygen amount was excess (comparative example 1-2, x=1.8), the conductivity decreased, and the capacity of the SIC material was not exhibited. Thus, the retention rate and the initial efficiency could not be measured. In the following examples, SiO$_x$ where x=0.9 was used.

Example 3-1 and Comparative Example 3-1

A secondary battery was produced as in example 1-1 except that the crystallinity of the SiO$_2$ component having a tridymite structure was adjusted. The adjustment was performed by changing the temperature of the material to be vaporized when the silicon compound was produced.

The silicon compounds in example 3-1 and comparative example 3-1 had the following physical properties: the silicon compound had a median size D$_{50}$ of 4 µm.

Moreover, in example 3-1 and comparative example 3-1, the amount of the carbon coating layer was 5 mass % with respect to the total amount of the silicon compound and the carbon coating layer.

The cycle performance and the first charge and discharge performance of the secondary batteries in example 3-1 and comparative example 3-1 were investigated. The result is given in Table 3.

TABLE 3

SiOx (x = 0.9), D50 = µm, Tridymite structure,
Amount of carbon coating 5 wt %, Polyimide, FEC:EC:DMC (1:2:7 vol
%) LiPF$_6$ 1.2 mol/kg, Positive electrode LiCoO$_2$

|  | SiO$_2$ half width | Retention rate % | Initial efficiency % |
| --- | --- | --- | --- |
| Example 1-1 | 0.1 | 80.1 | 67.5 |
| Example 3-1 | 0.15 | 80.3 | 67.3 |
| Comparative example 3-1 | 0.2 | 78.3 | 64.5 |
| Comparative example 1-1 | amorphous | 78.0 | 64.0 |

As shown in Table 3, when the diffraction peak around 21.825°, which is attributable to the tridymite structure, had a half width (2θ) more than 0.15°, i.e., when the SiO$_2$ component having the tridymite structure had low crystallinity (comparative example 3-1 and comparative example 1-1), both the initial efficiency and the retention rate were degraded. By contrast, when the half width (2θ) was 0.15° or less, both the initial efficiency and the retention rate were improved.

Examples 4-1 to 4-4

A secondary battery was produced as in example 1-1 except that the negative electrode for a non-aqueous electrolyte secondary battery was changed in the ratio A/B where A is a capacity at charging with a constant current up to 0.2V and B is a capacity at charging with a constant current and a constant voltage up to 0V. In this case, the silicon compound was adjusted to compare the battery capacities up to 0.20V in a lithium counter electrode at the bulk modification. The ratio A/B was measured in the following manner.

Firstly, a coin cell was produced. The coin cell was charged with a lithium counter electrode in CC (constant current) mode (current density: 0.2 mA/cm$^2$) up to 0(V), followed by CV (constant voltage) mode from 0(V). When the current became 0.04 mA/cm$^2$, the charging was terminated. The coin cell was then discharged with a constant current density of 0.2 mA/cm$^2$ until the cell voltage reached 1.2V. In this operation, the capacity A at charging with a constant current up to 0.2V and the capacity B at charging with a constant current and a constant voltage up to 0V were measured.

The silicon compounds in examples 4-1 to 4-4 had the following physical properties: the silicon compound had a median size $D_{50}$ of 4 μm; the silicon compound contained the $SiO_2$ component having a tridymite structure; the diffraction peak around 21.825° had a half width (2θ) of 0.10° in X-ray diffraction.

Moreover, in examples 4-1 to 4-4, the amount of the carbon coating layer was 5 mass % with respect to the total amount of the silicon compound and the carbon coating layer.

The cycle performance and the first charge and discharge performance of the secondary batteries in examples 4-1 to 4-4 were investigated. The result is given in Table 4.

TABLE 4

SiO$x$ (x = 0.9), D50 = 4 μm, Tridymite structure, Half width θ = 0.1, Amount of carbon coating 5 wt %, Polyimide, FEC:EC:DMC (1:2:7 vol %) LiPF$_6$ 1.2 mol/kg, Positive electrode LiCoO$_2$

| | A/B | Retention rate % | Initial efficiency % |
|---|---|---|---|
| Example 1-1 | 0.2 | 80.1 | 67.5 |
| Example 4-1 | 0 | 79.9 | 73.0 |
| Example 4-2 | 0.05 | 80.0 | 70.0 |
| Example 4-3 | 0.25 | 80.8 | 67.3 |
| Example 4-4 | 0.35 | 81.1 | 67.1 |

As shown in Table 4, when the ratio A/B was 0.2 or more, the capacity retention rate was improved. The ratio A/B was increased with the decrease in Si ratio in the bulk. A small Si ratio in the bulk enables inhibition of expansion deterioration with an increase in battery cycles, thus improving the capacity retention rate. In the following examples and comparative examples, the silicon compound having a ratio A/B of 0.35 was used.

Examples 5-1 to 5-5

A secondary battery was produced as in example 1-1 except that the $C_4H_9$ peak intensity of the $C_xH_y$ compound detected in the carbon coating layer was adjusted. The $C_4H_9$ peak intensity was adjusted by controlling the temperature and other conditions of the thermal CVD in the carbon coating step. In this case, negative ion mass spectrum attributable to the $C_xH_y$ compound was detected by TOF-SIMS.

The silicon compounds in examples 5-1 to 5-5 had the following physical properties: the silicon compound had a median size $D_{50}$ of 4 μm; the silicon compound contained the $SiO_2$ component having a tridymite structure; the diffraction peak around 21.825° had a half width (2θ) of 0.10° in X-ray diffraction.

Moreover, in examples 5-1 to 5-5, the amount of the carbon coating layer was 5 mass % with respect to the total amount of the silicon compound and the carbon coating layer.

The cycle performance and the first charge and discharge performance of the secondary batteries in examples 5-1 to 5-5 were investigated. The result is given in Table 5.

TABLE 5

SiO$x$ (x = 0.9), D50 = 4 μm, Tridymite structure, Half width θ = 0.1, Amount of carbon coating 5 wt %, Polyimide, FEC:EC:DMC (1:2:7 vol %) LiPF$_6$ 1.2 mol/kg, Positive electrode LiCoO$_2$, A/B = 0.35

| | $C_4H_9$ peak in negative ion mass spectrum ×10$^{-2}$ | Retention rate % | Initial efficiency % |
|---|---|---|---|
| Example 1-1 | 3.0 | 81.1 | 67.1 |
| Example 5-1 | 0.1 | 79.5 | 68.0 |
| Example 5-2 | 0.5 | 80.1 | 68.0 |
| Example 5-3 | 2.0 | 81.3 | 67.5 |
| Example 5-4 | 3.5 | 82.0 | 67.0 |
| Example 5-5 | 5.0 | 79.9 | 67.0 |

As shown in Table 5, when the $C_4H_9$ peak intensity ratio was 0.005 or more, the capacity retention rate was further improved. When the $C_4H_9$ peak intensity ratio was 0.035 or less, the initial efficiency and the capacity retention rate could be prevented from decreasing, and excellent battery performances were achieved. It was thus revealed that the battery performances are especially correlative to the amount of $C_4H_9$ component among the $C_xH_y$ compound detected in the carbon coating layer. In the following examples and comparative examples, the silicon compound having the carbon coating layer with a $C_4H_9$ peak intensity ratio of 0.030 was used.

Examples 6-1 to 6-3

A secondary battery was produced as in example 1-1 except that the amount of the carbon coating layer and the volume resistivity measured at 20 kN were adjusted. In this case, the carbon coating layer was formed on the surface of the silicon compound by the thermal CVD method. The amount of the carbon coating layer was adjusted by changing the temperature and treatment time in the thermal CVD of the silicon compound.

Comparative Example 6-1

In comparative example 6-1, a secondary battery was produced as in example 1-1 except that the negative electrode active material particles were produced without forming the carbon coating layer.

The silicon compounds in examples 6-1 to 6-3 and comparative example 6-1 had the following physical properties: the silicon compound had a median size $D_{50}$ of 4 μm; the silicon compound contained the $SiO_2$ component having a tridymite structure; the diffraction peak around 21.825° had a half width (2θ) of 0.10° in X-ray diffraction.

The cycle performance and the first charge and discharge performance of the secondary batteries in examples 6-1 to 6-3 and comparative example 6-1 were investigated. The result is given in Table 6.

TABLE 6

SiOx (x = 0.9), D50 = 4 μm, Tridymite structure,
Half widthθ = 0.1, Polyimide, ($C_4H_9$ spectrum) = 3.0 ×
$10^{-2}$, FEC:EC:DMC (1:2:7 vol %) $LiPF_6$ 1.2 mol/kg, Positive electrode
$LiCoO_2$, A/B = 0.35

| | Volume resistivity at 20 kN Ω · cm | Coverage mass % | Retention rate % | Initial efficiency % |
|---|---|---|---|---|
| Example 1-1 | 0.18 | 5% | 81.1 | 67.1 |
| Example 6-1 | 0.05 | 20% | 79.9 | 67.9 |
| Example 6-2 | 0.1 | 10% | 80.6 | 67.5 |
| Example 6-3 | 10 | 0.5% | 80.8 | 67.3 |
| Comparative example 6-1 | unmeasurable | 0% | 69.0 | 62.0 |

As shown in Table 6, the carbon coating in an amount of 0.1 mass % or more could sufficiently improve the conductivity. In addition, when the amount was 15 mass % or less, sufficient battery capacity could be achieved.

Moreover, as shown in Table 6, the battery exhibiting a volume resistivity of 10 Ω·cm or less under a load of 20 kN had good electrical conductivity, thus improving the battery performances. The battery exhibiting a volume resistivity of 0.1 Ω·cm or more could surely prevent short circuit and improved its safety. Comparative example 6-1, which did not contain the carbon coating layer, could not measure the volume resistivity at 20 kN.

Examples 7-1 to 7-4

A secondary battery was produced as in example 1-1 except that the crystallinity of a Si component of the silicon compound was changed. The crystallinity of the Si component was adjusted by changing the SiO precipitation temperature and time.

The silicon compounds in examples 7-1 to 7-4 had the following physical properties: the silicon compound had a median size $D_{50}$ of 4 μm; the silicon compound contained the $SiO_2$ component having a tridymite structure; the diffraction peak around 21.825° had a half width (2θ) of 0.10° in X-ray diffraction.

Moreover, in examples 7-1 to 7-4, the amount of the carbon coating layer was 5 mass % with respect to the total amount of the silicon compound and the carbon coating layer.

The cycle performance and the first charge and discharge performance of the secondary batteries in examples 7-1 to 7-4 were investigated. The result is given in Table 7.

TABLE 7

SiOx (x = 0.9), D50 = 4 μm, Triclymite structure, Half widthθ = 0.1,
Amount of carbon coating 5 wt %, Polyimide, ($C_4H_9$ spectrum) = 3.0 ×
$10^{-2}$, Specific resistivity 0.18 Ωcm, FEC:EC:DMC (1:2:7 vol %) $LiPF_6$
1.2 mol/kg, Positive electrode $LiCoO_2$, A/B = 0.35

| | Half width θ | Si (111) crystallite size nm | I (si)/I (sio2) C/D | Retention rate % | Initial efficiency % |
|---|---|---|---|---|---|
| Example 1-1 | 1.218 | 7.21 | 1.8 | 81.1 | 67.1 |
| Example 7-1 | 1.025 | 8.55 | 3.5 | 80.3 | 67.9 |
| Example 7-2 | 2.257 | 3.77 | 1 | 81.5 | 67.0 |
| Example 7-3 | 10.123 | 1.524 | 0.2 | 81.9 | 66.8 |
| Example 7-4 | 20.221 | amorphous | 0 | 82.1 | 66.5 |

The capacity retention rate and the initial efficiency changed in response to the variation in crystallinity of the Si component of the silicon compound. In particular, high retention rate and high initial efficiency were obtained by low crystallinity materials with a half width of 1.2° or more and a crystallite size of 7.5 nm or less, which is attributable to an Si(111) crystal plane. The best battery performances were obtained when the silicon compound was amorphous. Although example 7-4 exhibited a half width of 20° or more, this value was obtained by fitting with analysis software because the peak value was not obtained. This compound was substantially amorphous.

Examples 8-1 and 8-2

A secondary battery was produced basically as in example 1-1 except that potential, current, and the method for inserting and extracting lithium were changed when the silicon compound was bulk-modified for producing a lithium compound so as to adjust the condition of the compound produced in the silicon compound. For example, the electrochemical modification produces LiF, $Li_2CO_3$, and $Li_2O$ on the surface and $Li_2SiO_3$, $Li_6Si_2O_7$, and $Li_4SiO_4$ in the interior of the silicon compound. Moreover, lithium compounds on the surface could be removed by washing with water.

The silicon compounds in examples 8-1 and 8-2 had the following physical properties: the silicon compound had a median size $D_{50}$ of 4 μm; the silicon compound contained the $SiO_2$ component having a tridymite structure; the diffraction peak around 21.825° had a half width (2θ) of 0.10° in X-ray diffraction.

Moreover, in examples 8-1 and 8-2, the amount of the carbon coating layer was 5 mass % with respect to the total amount of the silicon compound and the carbon coating layer.

The cycle performance and the first charge and discharge performance of the secondary batteries in examples 8-1 and 8-2 were investigated. The result is given in Table 8.

TABLE 8

SiOx (x = 0.9), D50 = 4 μm, Tridymite structure, Half widthθ = 0.1,
Amount of carbon coating 5 wt %, Polyimide, ($C_4H_9$ spectrum) = 3.0 ×
$10^{-2}$, Specific resistivity 0.18 Ωcm, C/D = 1.0, FEC:EC:CMC (1:2:7
vol %) $LiPF_6$ 1.2 mol/kg, Positive electrode $LiCoO_2$, A/B = 0.35

| | Compound contained in surface layer | Compound contained in interior | Retention rate % | Initial efficiency % |
|---|---|---|---|---|
| Example 1-1 | none | none | 81.5 | 67.0 |
| Example 8-1 | LiF, Li2CO3, Li2O | none | 84.1 | 76.4 |
| Example 8-2 | LiF, Li2CO3, Li2O | Li4SiO4, Li6Si2O7, Li2SiO3 | 85.0 | 77.1 |

As shown in Table 8, the silicon compound containing LiF, $Li_2CO_3$, and $Li_2O$ on its surface and $Li_4SiO_4$, $Li_6Si_2O_7$, and $Li_2SiO_3$ in its interior could improve the battery performances.

Examples 9-1 and 9-2

A secondary battery was produced basically as in example 1-1 except that the silicon compound was not bulk-modified in example 9-1, and the silicon compound was bulk-modified by a thermal doping method in example 9-2. The thermal doping method is to mix the silicon compound with lithium metal or a lithium compound and heat the mixture for modification.

The silicon compounds in examples 9-1 and 9-2 had the following physical properties: the silicon compound had a median size $D_{50}$ of 4 μm; the silicon compound contained the $SiO_2$ component having a tridymite structure; the diffraction peak around 21.825° had a half width (2θ) of 0.10° in X-ray diffraction.

Moreover, in examples 9-1 and 9-2, the amount of the carbon coating layer was 5 mass % with respect to the total amount of the silicon compound and the carbon coating layer.

The cycle performance and the first charge and discharge performance of the secondary batteries in examples 9-1 and 9-2 were investigated. The result is given in Table 9.

TABLE 9

SiOx (x = 0.9), D50 = 4 μm, Tridymite structure, Half width θ = 0.1, Amount of carbon coating 5 wt %, Polyimide, ($C_4H_9$ spectrum) = 3.0 × $10^{-2}$, Specific resistivity 0.18 Ωcm, C/D = 1.0, FEC:EC:DMC (1:2:7 vol %) $LiPF_6$ 1.2 mol/kg, Positive electrode $LiCoO_2$, A/B = 0.35

|  | Modification method | Retention rate % | Initial efficiency % |
|---|---|---|---|
| Example 9-1 | — | 81.5 | 67.0 |
| Example 1-1 | electrochemical modification method | 82.7 | 76.0 |
| Example 9-2 | thermal doping method | 78.0 | 75.2 |

The modification by the electrochemical method could form a more stable substance than did the thermal modification (the thermal doping method), in which the compound was randomly modified.

Examples 10-1 to 10-9

A secondary battery was produced basically as in example 1-1 except that the negative electrode active material particles were mixed with carbon-based active material particles to produce the negative electrode. Furthermore, as shown in Table 10, the ratio X/Y, where X is the median size of the carbon-based active material and Y is the median size of the silicon compound, was changed. Moreover, as shown in Table 10, the silicon compound containing no lithium compound on its surface and in its interior was used in example 10-1. By contrast, the silicon compound containing LiF, $Li_2CO_3$, and $Li_2O$ on its surface and $Li_4SiO_4$, $Li_6Si_2O_7$, and $Li_2SiO_3$ in its interior was used in examples 10-2 to 10-9.

The silicon compounds in examples 10-1 to 10-9 had the following physical properties: the silicon compound had a median size $D_{50}$ of 4 μm; the silicon compound contained the $SiO_2$ component having a tridymite structure; the diffraction peak around 21.825° had a half width (2θ) of 0.10° in X-ray diffraction.

Moreover, in examples 10-1 to 10-9, the amount of the carbon coating layer was 5 mass % with respect to the total amount of the silicon compound and the carbon coating layer.

The cycle performance and the first charge and discharge performance of the secondary batteries in examples 10-1 to 10-9 were investigated. The result is given in Table 10.

TABLE 10

SiOx (x = 0.9), Tridymite structure, Half width θ = 0.1, Amount of carbon coating 5 wt %, Polyacrylic acid, ($C_4H_9$ spectrum) = 3.0 × $10^{-2}$, Specific resistivity 0.18 Ωcm, C/D = 1.0, FEC:EC:DMC (1:2:7 vol %) $LiPF_6$ 1.2 mol/kg, Positive electrode $LiCoO_2$, A/B = 0.35

| Table 10 | Compound contained in surface layer | Compound contained in interior | Silicon material D50 μm | Silicon material D50 μm | X/Y | Retention rate % | Initial efficiency % |
|---|---|---|---|---|---|---|---|
| Example 10-1 | — | — | 4 | 12 | 3 | 81.0 | 81.5 |
| Example 10-2 | LiF, Li2CO3, Li2O | Li4SiO4, Li6Si2O7, Li2SiO3 | 4 | 20 | 5 | 88.1 | 83.2 |
| Example 10-3 | LiF, Li2CO3, Li2O | Li4SiO4, Li6Si2O7, Li2SiO3 | 4 | 16 | 4 | 88.0 | 86.1 |
| Example 10-4 | LiF, Li2CO3, Li2O | Li4SiO4, Li6Si2O7, Li2SiO3 | 4 | 12 | 3 | 87.9 | 85.9 |
| Example 10-5 | LiF, Li2CO3, Li2O | Li4SiO4, Li6Si2O7, Li2SiO3 | 4 | 8 | 2 | 87.6 | 84.1 |
| Example 10-6 | LiF, Li2CO3, Li2O | Li4SiO4, Li6Si2O7, Li2SiO3 | 4 | 4 | 1 | 87.1 | 83.6 |
| Example 10-7 | LiF, Li2CO3, Li2O | Li4SiO4, Li6Si2O7, Li2SiO3 | 4 | 2 | 0.5 | 83.1 | 82.8 |
| Example 10-8 | LiF, Li2CO3, Li2O | Li4SiO4, Li6Si2O7, Li2SiO3 | 8 | 4 | 0.5 | 81.4 | 85.3 |
| Example 10-9 | LiF, Li2CO3, Li2O | Li4SiO4, Li6Si2O7, Li2SiO3 | 8 | 16 | 2 | 85.6 | 86.4 |

As shown in Table 10, the carbon-based active material in the negative electrode active material layer is preferably equal to or larger than the silicon-based active material. When the silicon-based active material, which was expandable and contractible, was equal to or smaller than the carbon-based active material, breakage of the mixture layer could be prevented. When the carbon-based active material was larger than the silicon-based active material, the volume density of the negative electrode at charging, the initial efficiency, and thus the battery energy density were improved.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode material for a non-aqueous electrolyte secondary battery, comprising:
    negative electrode active material particles containing a silicon compound expressed by $SiO_x$ where $0.5 \leq x \leq 1.6$, the silicon compound being coated with a carbon coating layer composed of a carbon component, wherein
        the negative electrode active material particles contain a $SiO_2$ component having a tridymite structure and exhibit a diffraction peak around 21.825° with a half width (2θ) of 0.15° or less in X-ray diffraction,
        the silicon compound exhibits a diffraction peak having a half width (2θ) of 1.2° or more, the diffraction peak being attributable to an Si(111) crystal plane and obtained by X-ray diffraction, and a crystallite size attributable to the crystal plane is 7.5 nm or less, and
        the negative electrode active material particles contain in their surface layer at least one lithium compound selected from LiF, $Li_2CO_3$ and $Li_2O$.

2. The negative electrode material for a non-aqueous electrolyte secondary battery according to claim 1, wherein the carbon coating layer exhibits fragments of $C_xH_y$ compound, the $C_xH_y$ compound being a hydrocarbon compound composed of only carbon and hydrogen where x is the number of carbon atoms and y is the number of hydrogen atoms, when subjected to TOF-SIMS.

3. The negative electrode material for a non-aqueous electrolyte secondary battery according to claim 2, wherein a ratio of a $C_4H_9$ peak intensity to a $C_3H_5$ peak intensity of the $C_xH_y$ compound detected in the carbon coating layer ranges from 0.005 to 0.035.

4. The negative electrode material for a non-aqueous electrolyte secondary battery according to claim 1, wherein an amount of the carbon coating layer ranges from 0.5 mass % to 15 mass % with respect to a total amount of the silicon compound and the carbon coating layer.

5. The negative electrode material for a non-aqueous electrolyte secondary battery according to claim 1, wherein the negative electrode active material particles exhibit a volume resistivity ranging from 0.10 Ω·cm to 10 Ω·cm under a load of 20 kN.

6. The negative electrode material for a non-aqueous electrolyte secondary battery according to claim 1, wherein the silicon compound satisfies C/D≤1.8 where C is a diffraction peak intensity attributable to a Si(111) crystal plane and D is a diffraction peak intensity attributable to the $SiO_2$ component having a tridymite structure, as obtained by X-ray diffraction.

7. The negative electrode material for a non-aqueous electrolyte secondary battery according to claim 1, wherein a Si component of the silicon compound is amorphous.

8. The negative electrode material for a non-aqueous electrolyte secondary battery according to claim 1, wherein the negative electrode active material particles contain in their interior at least one lithium compound selected from $Li_4SiO_4$, $Li_6Si_2O_7$, and $Li_2SiO_3$.

9. The negative electrode material for a non-aqueous electrolyte secondary battery according to claim 1, wherein the lithium compound contained in the surface layer or the interior of the negative electrode active material particles is produced in an electrochemical manner.

10. A negative electrode for a non-aqueous electrolyte secondary battery comprising a negative electrode material according to claim 1.

11. The negative electrode for a non-aqueous electrolyte secondary battery according to claim 10, further comprising a carbon-based active material, wherein a median size X of the carbon-based active material and a median size Y of the silicon compound expressed by $SiO_x$ satisfy X/Y≥1.

12. The negative electrode for a non-aqueous electrolyte secondary battery according to claim 10, wherein the negative electrode satisfies A/B≥0.2 where A is a capacity when the negative electrode is charged with a constant current up to 0.2V and B is a capacity when the negative electrode is charged with a constant current and a constant voltage up to 0V.

13. A non-aqueous electrolyte secondary battery comprising a negative electrode according to claim 10.

14. A method of producing negative electrode active material particles containing a silicon compound expressed by $SiO_x$ where $0.5 \leq x \leq 1.6$, the method comprising:
    producing a silicon compound particle expressed by $SiO_x$ where $0.5 \leq x \leq 1.6$;
    evaluating whether the produced silicon compound particle contains a $SiO_2$ component having a tridymite structure or not;
    selecting the silicon compound particle if the silicon compound particle contains the $SiO_2$ component having a tridymite structure and exhibits a diffraction peak around 21.825° with a half width (2θ) of 0.15° or less as measured by X-ray diffraction in the evaluation; and
    coating the selected silicon compound particle with a carbon coating layer composed of a carbon component to produce negative electrode active material particles.

15. A method of producing negative electrode active material particles containing a silicon compound expressed by $SiO_x$ where $0.5 \leq x \leq 1.6$, the method comprising the steps of:
    producing a silicon compound particle expressed by $SiO_x$ where $0.5 \leq x \leq 1.6$;
    coating the silicon compound particle with a carbon coating layer composed of a carbon component; and
    making at least one lithium compound selected from LiF, $Li_2CO_3$ and $Li_2O$ contained in a surface layer of the negative electrode active material particles, wherein
        the step of coating with the carbon coating layer includes heating the silicon compound particle at a reaction temperature of 1000° C. or lower such that the silicon compound particle contains a $SiO_2$ component having a tridymite structure and exhibits a diffraction peak around 21.825° with a half width (2θ) of 0.15° or less in X-ray diffraction, and the silicon compound exhibits a diffraction peak having a half width (2θ) of 1.2° or more, the diffraction peak being attributable to an Si(111) crystal plane and obtained by X-ray diffraction, and a crystallite size attributable to the crystal plane is 7.5 nm or less.

* * * * *